Aug. 22, 1939.    L. C. FISHER ET AL    2,170,285
DETACHABLE COLLECTOR
Filed Sept. 25, 1937    3 Sheets-Sheet 1
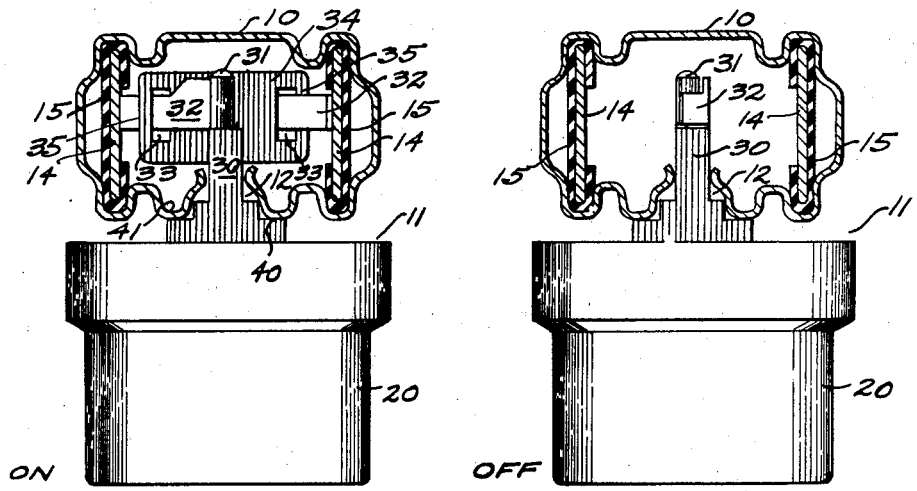
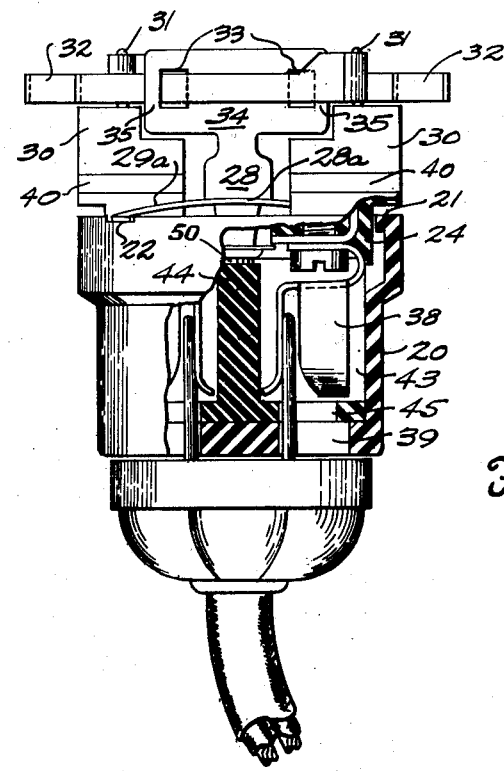
INVENTORS
Lyman C. Fisher
BY William S. Frank
Daniel G. Cullen ATTORNEY.

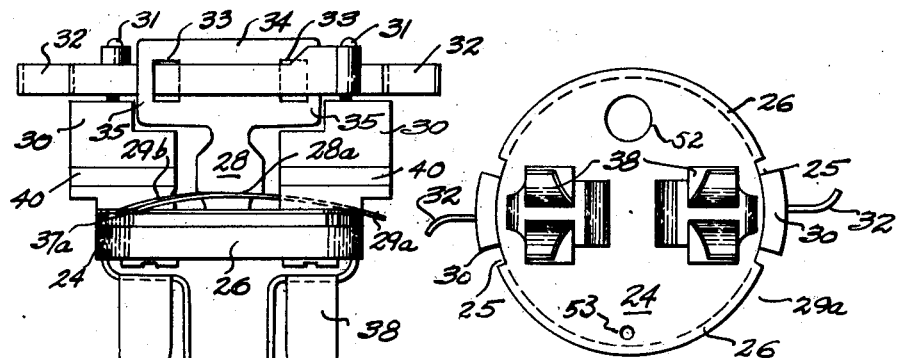
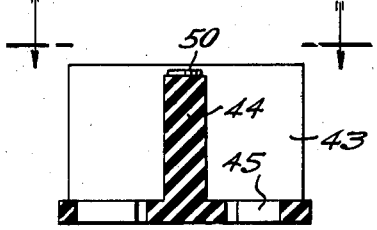
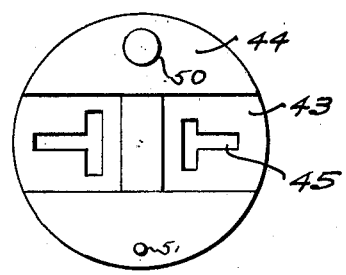
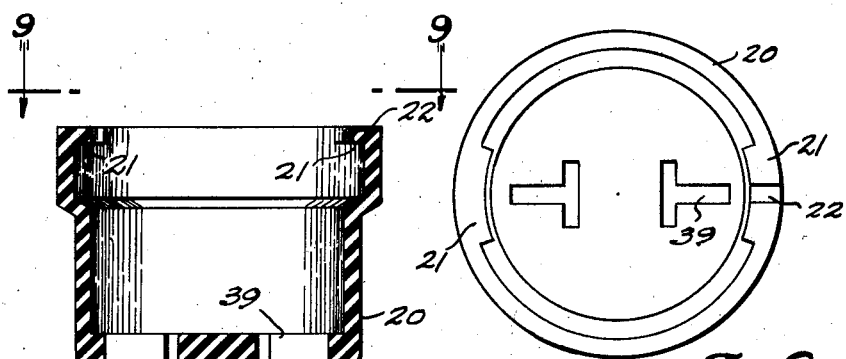

Aug. 22, 1939.     L. C. FISHER ET AL     2,170,285
DETACHABLE COLLECTOR
Filed Sept. 25, 1937     3 Sheets-Sheet 3

INVENTORS
Lyman C. Fisher
BY William H. Frank
Daniel G. Cullen ATTORNEY.

Patented Aug. 22, 1939

2,170,285

UNITED STATES PATENT OFFICE 2,170,285

DETACHABLE COLLECTOR

Lyman C. Fisher and William H. Frank, Detroit, Mich.

Application September 25, 1937, Serial No. 165,608

8 Claims. (Cl. 173—328)

This application relates to detachable collectors suitable for use with slotted tubular bus duct, and is a continuation in part of our prior co-pending application Serial No. 41,048, filed September 18, 1935, entitled Detachable collectors, now Patent No. 2,134,753 of November 1, 1938.

The foregoing application discloses a cord terminal type collector, whereas the instant application discloses a receptacle type collector, formed to receive the prongs of a conventional cord terminal type cap plug.

For an understanding of the collector shown herein reference should be had to the description which follows and to the appended drawings. In these drawings:

Figs. 1 and 2 show a receptacle type collector of the invention, shown in a duct in inserted (on) and insertable (out) positions, respectively;

Fig. 3 is a cutaway elevation view of the collector, with a cap plug in association therewith.

Figs. 4, 5 and 6 together form an exploded view of the major parts of the collector.

Figs. 7, 8 and 9 are views on lines 7—7, 8—8, and 9—9 respectively of Figs. 4, 5, and 6 respectively.

Figure 10:
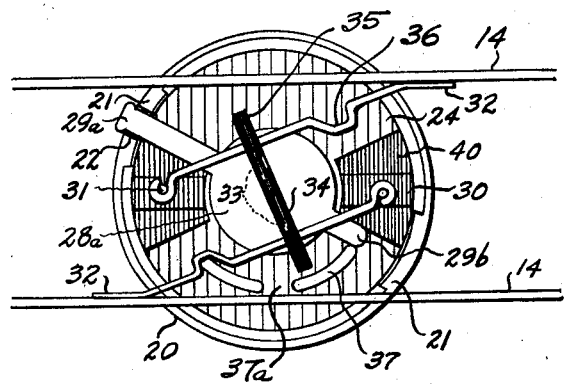
Figure 11:
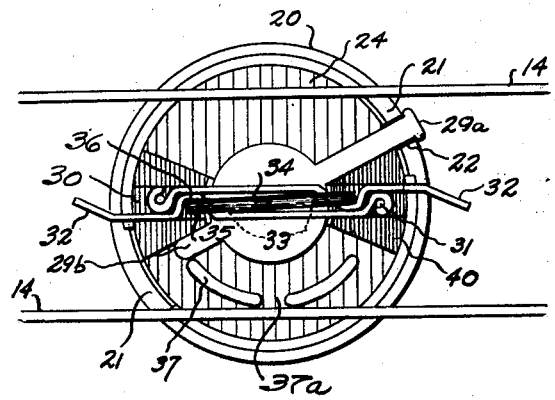

Figs. 10 and 11 are top plan views corresponding to Figs. 1 and 2.

The slotted tubular duct 10 with which the collector, referenced generally 11, is to be associated, has an enlonged continuous slot 12 in its bottom wall on opposite sides of which are bus bars 14 whose exposed strips are to be engaged by separated contacts of the connector. Each bus bar is enclosed within insulation 15.

The collector itself comprises a cup shaped cap or rotary contact spreader part 20 (Fig. 6) of insulation whose margin is provided with diametrically opposed interiorly projecting locking lugs 21 (Fig. 9) one of which has a slot 22 in its upper surface. Disposed within and forming a closure for the open top of the cap is a plate or contact carrier 24 also of insulation (Fig. 4), the plate having diametrically opposed notches 25 complementing the lugs 21. It is observed that when the notches are in register with the lugs the plate 24 may be withdrawn from or associated with the cap; when the notches are out of register with the lugs the plate will have its marginal portions 26, between the notches 25, disposed under the lugs 21 and be held in the cap. Normally the plate and the cap are associated and resiliently held together by means to be described, but it is understood that for purposes of assembly or repair disassociation of the plate and cap may be effected.

The plate 24 is centrally apertured and journalled within this aperture in an axially immovable manner is a post 28 of insulation on which is keyed a metal spring washer 28a provided with diametrically opposed extensions 29a—29b, the longer one of which 29a projects beyond the edge of the plate and is dimensioned to fit within a notch 22 of the cap lug 21.

It will be observed that when the plate and cap are associated with each other and the extension 29a is in the notch 22, the plate and cap will be resiliently held in inseparable association with the washer 28a keying the cap and the central post to each other, the plate acting as a journal for the cap and the central post so that these may rotate together around the plate. Relative rotary movement of the plate and the cap, without their disassociation may take place, and is limited by the engagement of an extension 29a or 29b with sides of posts 30 projecting upwardly from the plate.

On the other hand, when the extension 29a is out of the notch 22, and rides on the unslotted part of the marginal edge of the cap, the cap may be rotated sufficiently to have its lugs 21 clear the plate notches 25 to permit disassociation of the cap and the plate.

Projecting upwardly from the plate and diametrically opposed and aligned with the notches 25 thereof are contact supporting posts 30 from which upwardly project metallic pins 31 which form pivotal mountings for elongated contact leaves 32 of contact material such as copper; the leaves are substantially parallel and project in opposite directions from their pivotal mountings; each leaf passes through a slot 33 of a cam 34 formed as part of the central post.

It is observed that when the cap 20, and with it the central post 28 and the cam 34, are in one position with respect to the plate (Fig. 10), contact leaves 32 are forcibly directed and retained away from each other as far as possible by the inner edges of the cam slots; whereas when the cap 20, the post 28, and the cam 34 are in another position with respect to the plate (Fig. 11), the contact leaves are forcibly directed and retained together by the edge portions 35 of the cam to be as close as possible in substantially a straight and single line.

It is also to be observed that when the cam 34 and the contact leaves 32 are in their extreme position last mentioned, that is with the contact leaves as close to each other as possible, that the edge portions 35 of the cam 34 seat within bends 36 of the leaves so that the leaves and the cam 34 will occupy as little space as possible in a direction across the thickness of the cam; this is of advantage in that it enables the parts to be disposed within as narrow a slot of the duct as possible.

Since it is desirable that movement of cam 34 and post 28 from one position to the other with respect to the plate be defined and be indexed positively and with a snap action, there has been provided, on plate 24, a raised arcuate rail 37 on which rides the extension 29b of the spring washer 28a keyed to cam post 28. The gaps between the ends of the rail and the contact supporting posts 30 of the plate 24 define the limits of movement of the extension 29b and the cam 34 with respect to plate 24 and the dropping of extension 29b off the rail at its ends provides the snap action desired.

Switching

If desired, the rail 37 may be provided, between its ends, with a notch 37a into which may drop the extension 29b to define a position in which the contact leaves 32, though spread apart sufficiently to prevent removal of the collector from the duct, will be remote from the bus bars 14 and out of engagement therewith. By rotating cap 20 so that extension 29b moves from notch 37a to the proper end of rail 37 and back, snap switching action may be effected, to make or break contact, all without removing the collector from the duct.

On the under side of the plate 24 are female contacts 38 connected to the contact mounting pins 31 whereby prongs of cap plugs passed through slots 39 of the cap may be electrically and physically connected to the contact leaves 32; the contacts and prongs are contained within slots 43 of a filler block 44 disposed within the cap 20 and are thus shielded by the barrier between the slots 43 which are open sided and have access slots 45 for the prongs; the insertion of these prongs through the cap slots 39 and the filler block slots 45 serves to interlock the filler block and the cap relatively in proper position.

Operation

When the collector is to be associated with a duct, the cap 20 and the parts keyed thereto, namely post 28, leaves 29a and 29b, and cam 34 are positioned with respect to the plate 24 so that the contact leaves 32 are as close together as possible; then the contact leaves, the cam and the contact supporting posts 30 are thrust into the duct through the slot thereof until the lower stops 40 of the posts abut against beads 41 of the duct bottom. Thereafter, the cap 20 may be grasped from the outside and rotated with respect to the plate 24, which is held against rotation by the engagement of the contact supporting posts 30 with the edges of the slot of the duct; rotation of the cap 20 causes rotation of the cam 34 and spreads the contact leaves 32 so that these engage the exposed strips of the bus bars. The proportions of the parts are such that such engagement causes a friction or clamp lock between the collector and the duct with the contact leaves 32 in contact making position; this alone, or as supplemented by the engagement of the lower edges of cam 34 with the edges of the duct slot will prevent the collector from dropping out of the duct.

It is observed that the marginal edge of the cap is spaced axially from the stops 40 a considerable distance so that the collector may be associated with the duct at any point thereof, even at points where there are coupler sleeves, doors, etc., in the bottom wall of the duct.

It is also observed that when the collector has its parts in contact making position that the camming plate forms a transverse barrier in the duct as well as a spreader, and insures adequate clearance between the contact leaves.

It is also observed that when the collector has its parts in contact making position that the slots 45 of the filler block 44 are alined with the slots 39 of the cap for plug prong reception; when the contact parts of the collector are out of contact making position, the slots 45 are out of register with the slots 39; thus, assurance is had against removal of contact leaves 32 from the bus bars under load, that is with the plug prongs engaged with the contacts 38.

It will also be observed that the filler block has a large pin 50 and a small pin 51 orienting it to the cap through a large socket 52 and a small socket 53 therein; this feature, coupled with the fact that the filler block access slots are of different sizes for receiving plug prongs of different sizes, serves to polarize the plug prongs to the contact leaves, and these may be polarized in turn to the bus bars by relying on the feature that when the collector carrier posts and contact leaves are thrust into the duct slot, the collector cup can be rotated, for spreading the contact leaves, in one direction only, and by properly marking the duct and the collector so that the collector when being inserted may be seen to be properly oriented or polarized to the duct bus bars, one of which is "live" and the other of which may be "grounded".

For example, the side of the duct bearing the grounded bus bar may be marked "GR", and the other side of the duct may be unmarked; and the collector may similarly be marked, either by a positive mark on the body of the collector or by having the contact leaves of different colors, dark for the live side and bright for the grounded side, as is conventional. In this way an indication will be given enabling proper orientation of the collector and the load to the duct and its bus bars.

Assembly

The assembly of the parts of the collector to form a unitary collector will now be described.

The filler block 44 (Figs. 5 and 8), held upside down, is assembled on the plate 24 (Figs. 4 and 7), also held upside down with care being taken to register pins 50—51 of the filler block with holes 52—53 of the plate properly and respectively; then the cap 20 (Figs. 6 and 9), also held upside down, is placed on the filler block and plate sub assembly and rotated clockwise until cap lugs 21 slide down and dispose themselves in plate notches 25: clockwise rotation of cap 20 is continued, with cap lugs 21 now riding under plate marginal portions 26, until cap notch 22 reaches extension 29a of the spring washer 28a, whereupon extension 29a snaps into notch 22 and resiliently maintains the parts in assembly.

Disassembly is effected by holding the collector upside down, pulling extension 29a down and out of notch 22, rotating cap 20 counterclockwise until cap lugs 21 clear plate marginal portions 26 and register with plate notches 25, lifting cap 20 and then block 44 off plate 24.

Now having described the collector disclosed herein, reference will be had to the following claims for a definition of the inventions embodied in such collector.

We claim:

1. A detachable collector of the character described comprising a carrier, main contacts thereon, means journalled in the carrier for moving the contacts relatively, to spread them or draw them closer, a cup capped by the carrier for moving the means, and auxiliary contacts carried by the carrier and disposed within the cup, the latter having openings providing access through the cup to such auxiliary contacts.

2. A detachable collector of the character described comprising a carrier, main contacts thereon, means journalled in the carrier for moving the contacts relatively, to spread them or draw them closer, a cup capped by the carrier for moving the means, and auxiliary contacts carried by the carrier and disposed within the cup, the latter having openings providing access through the cup to such auxiliary contacts, the cup having a barrier between the auxiliary contacts.

3. A detachable collector of the character described comprising a carrier, main contacts thereon, means journalled in the carrier for moving the contacts relatively, to spread them or draw them closer, a cup capped by the carrier for moving the means, and auxiliary contacts carried by the carrier and disposed within the cup, the latter having openings providing access through the cup to such auxiliary contacts, the cup containing a block forming a barrier between the auxiliary contacts.

4. A detachable collector of the character described comprising a carrier, main contacts thereon, means journalled in the carrier for moving the contacts relatively, to spread them or draw them closer, a cup capped by the carrier for moving the means, and auxiliary contacts carried by the carrier and disposed within the cup, the latter having openings providing access through the cup to such auxiliary contacts, the cup containing a block separate therefrom and loosely mounted therein and disposed between the auxiliary contacts, the block and carrier having formations cooperating with one another to insure against relative assembly of the various parts in all but one relative position, the cup openings being different in contour, the cup and carrier having cooperating formations preventing their relative movement for contact spreading in all but one direction.

5. A detachable collector of the character described comprising a carrier, main contacts thereon, means journalled in the carrier for moving the contacts relatively, to spread them or draw them closer, a cup capped by the carrier for moving the means, and auxiliary contacts carried by the carrier and disposed within the cup, the latter having openings providing access through the cup to such auxiliary contacts for prongs of a conventional cap plug, the aforementioned parts being so arranged that when the prongs are in the cup openings and engage the auxiliary contacts, rotation of the cup and means relative to the carrier for drawing the main contacts closer is inhibited, absence of the prongs from the auxiliary contacts being required before such rotation can be effected, the aforementioned parts also being so arranged that the main contacts must be spread before the prongs can be inserted into the auxiliary contacts.

6. A detachable collector of the character described comprising a carrier, main contacts thereon, means journalled in the carrier for moving the contacts relatively, to spread them or draw them closer, a cup capped by the carrier for moving the means, and auxiliary contacts carried by the carrier and disposed within the cup, the latter having openings providing access through the cup to such auxiliary contacts for prongs of a conventional cap plug, the aforementioned parts being so arranged that when the prongs are in the cup openings and engage the auxiliary contacts, rotation of the cup and means relative to the carrier for drawing the main contacts closer is inhibited, absence of the prongs from the auxiliary contacts being required before such rotation can be effected, the aforementioned parts also being so arranged that the main contacts must be spread before the prongs can be inserted into the auxiliary contacts, the cup having a barrier between the auxiliary contacts and between the prongs engaging the auxiliary contacts.

7. A detachable collector of the character described comprising a carrier, main contacts thereon, means journalled in the carrier for moving the contacts relatively, to spread them or draw them closer, a cup capped by the carrier for moving the means, and auxiliary contacts carried by the carrier and disposed within the cup, the latter having openings providing access through the cup to such auxiliary contacts for prongs of a conventional cap plug, the aforementioned parts being so arranged that when the prongs are in the cup openings and engage the auxiliary contacts, rotation of the cup and means relative to the carrier for drawing the main contacts closer is inhibited, absence of the prongs from the auxiliary contacts being required before such rotation can be effected, the aforementioned parts also being so arranged that the main contacts must be spread before the prongs can be inserted into the auxiliary contacts, the cup having a barrier between the auxiliary contacts and between the prongs engaging the auxiliary contacts, the barrier being a partition block within the cup.

8. A detachable collector of the character described comprising a carrier, main contacts thereon, means journalled in the carrier for moving the contacts relatively, to spread them or draw them closer, a cup capped by the carrier for moving the means, and auxiliary contacts carried by the carrier and disposed within the cup, the latter having openings providing access through the cup to such auxiliary contacts for prongs of a conventional cap plug, the aforementioned parts being so arranged that when the prongs are in the cup openings and engage the auxiliary contacts, rotation of the cup and means relative to the carrier for drawing the main contacts closer is inhibited, absence of the prongs from the auxiliary contacts being required before such rotation can be effected, the aforementioned parts also being so arranged that the main contacts must be spread before the prongs can be inserted into the auxiliary contacts, the cup containing a block separate therefrom and loosely mounted therein and disposed between the auxiliary contacts, the block and carrier having formations cooperating with one another to insure against relative assembly of the various parts in all but one relative position, the cup openings being different in contour, the cup and carrier having cooperating formations preventing their relative movement for contact spreading in all but one direction.

LYMAN C. FISHER.
WILLIAM H. FRANK.